H. H. Potter,
Fly Trap,
N° 61,096. Patented Jan. 8, 1867.
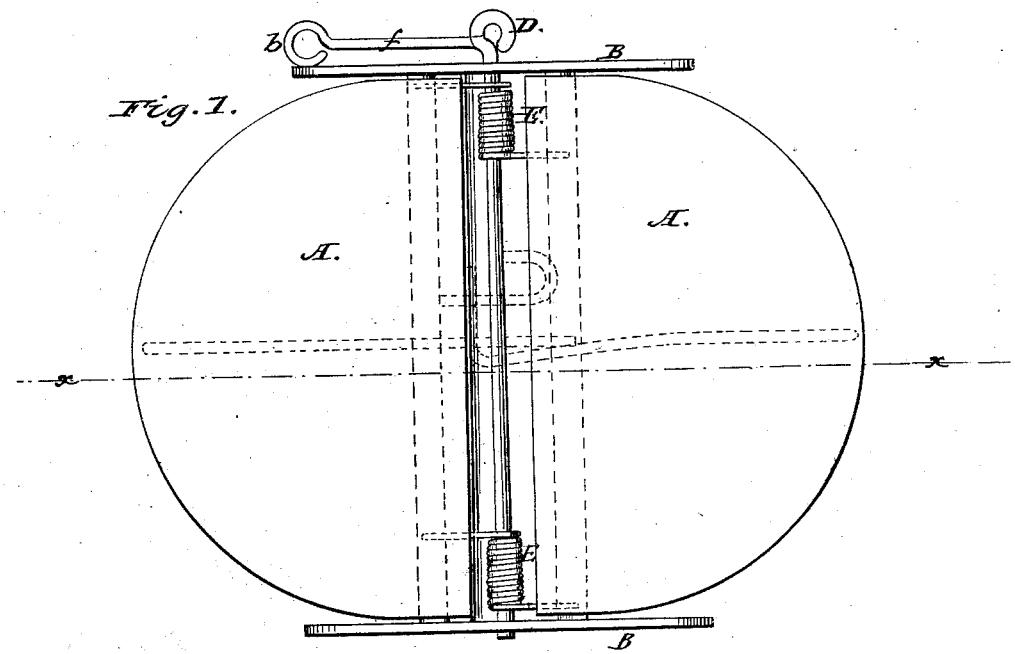

UNITED STATES PATENT OFFICE.

HENRY H. POTTER, OF CARTHAGE, NEW YORK.

Letters Patent No. 61,096, dated January 8, 1867.

---

IMPROVEMENT IN FLY-TRAPS.

---

*The Schedule referred to in these Letters Patent and making part of the same.*

---

TO ALL WHOM IT MAY CONCERN:

Be it known that I, HENRY H. POTTER, of Carthage, in the county of Jefferson, and State of New York, have invented a new and useful Improvement in Fly-Trap; and I do hereby declare that the following is a full, clear, and exact description thereof, which will enable those skilled in the art to make and use the same, reference being had to the accompanying drawings, forming part of this specification.

My invention consists in an arrangement of pans and wires combined with springs by which I am enabled to make an effective trap for the destruction of house flies. In the accompanying drawings—

Figure 1 represents a top view of my trap as it appears when set.

Figure 2 is a transverse section of fig. 1 through the line $x\ x$.

Similar letters of reference indicate corresponding parts.

A A are the pans upon which the flies alight, and upon which the bait is placed. B represents the end pieces or standards of the trap. C is a hollow cylindrical vessel connecting the ends B together. D is a wire rod running through the upper portion of the ends B. E represents two spiral springs which are supported by the rod D, the ends of which are attached to the two pans A, one end of each spring to one pan, and the other end to the other pan, so that when the pans are opened the spring is strained at both ends and the tension is balanced thereby. Attached to the under side of these pans are wires $a\ a$, which are bent in such a form that when the trap is set as in the drawing, (fig. 1,) the wires encircle the vessel C, and the ends are bent so that they hook together when the pans are extended or when the trap is set. $f$ is a bent lever of wire which passes through one of the ends and extends to the middle of the vessel C, or to where the two wires $a\ a$ hook together under the vessel C. At this point the end of this lever is bent in such a manner that when the outer end $b$ is pressed down, the inner end will unhook the two wires $a\ a$, when the recoil of the spiral springs throws the two pans together killing the flies. When the pans are extended the flies drop into the vessel C which is partially filled with water. In this way the flies which infest a dwelling-house can soon be destroyed.

Having thus described my invention, what I claim as new, and desire to secure by Letters Patent, is—

1. The vessel C, in combination with the two pans A A, for receiving the remains of the entrapped flies when the pans are opened, substantially as herein shown and described.

2. The bent wires $a\ a$, their upper arms supporting the pans A A, and their lower ends interlocking and holding the pans open until released by the detent $f$, as and for the purpose specified.

HENRY H. POTTER.

Witnesses:
C. L. FREDERICK,
G. F. BIRCHARD.